United States Patent [19]

Kandarian

[11] 4,353,295

[45] Oct. 12, 1982

[54] WIRE TYING FIXTURE

[75] Inventor: Ernest Kandarian, Clovis, Calif.

[73] Assignee: Fresno Bag Co., Inc., Fresno, Calif. ; a part interest

[21] Appl. No.: 167,237

[22] Filed: Jul. 10, 1980

[51] Int. Cl.³ .......................... A01F 15/14; B65B 13/24
[52] U.S. Cl. .......................................... 100/8; 140/117
[58] Field of Search ................... 140/111, 93 A, 93.2, 140/116–117, 115; 100/3, 8, 34

[56] References Cited

U.S. PATENT DOCUMENTS

| 3,168,912 | 2/1965 | Marica | 140/111 X |
| 3,477,363 | 11/1969 | Trumbo | 100/34 |
| 3,863,297 | 2/1975 | Simich | 100/8 |
| 3,863,558 | 2/1975 | Trumbo | 100/34 X |
| 4,114,527 | 9/1978 | O'Neill | 140/115 X |

Primary Examiner—Kenneth J. Ramsey
Attorney, Agent, or Firm—Huebner & Worrel

[57] ABSTRACT

A wire tying fixture for use with a pair of wires having individual loops adapted to intertie when overlapped and subsequently tensioned, the fixture having an open-ended, downwardly slotted longitudinal channel adapted to receive the wires thrust loop-first from its opposite ends, a notched false bottom disposed beneath a tying station in the channel and pivotally mounted for movement between a closed position, into which the bottom is resiliently urged to support the wires in the channel with the notch holding one of the loops to facilitate thrusting of the other loop into overlapping relation, and a retracted position to release the intertied wires and having a leaf spring mounted at the tying station presenting resilient camming surface which engages the loops and urges them toward one side of the channel into intertying engagement over the false bottom.

6 Claims, 7 Drawing Figures

WIRE TYING FIXTURE

BACKGROUND OF THE INVENTION

1. Field of the Invention

The present invention relates to a wire tying fixture, and more particularly to such a fixture for engaging a pair of pre-formed wire loops in interlaced relation to secure a wire tie about a cotton bale or the like.

2. Description of the Prior Art

The use of wire ties for cotton bales and the like is well known, the ties being secured about bales while they are compressed by platens in a bale chamber, each tie having opposite ends providing pre-formed loops which mate in a square knot configuration to secure the tie tensioned about a bale. One platen of each bale chamber is provided with a plurality of fixtures individual to the ties, each having a channel disposed toward the bale chamber. The wires, bearing a pair of mating loops, are passed about a bale held under compression in the bale chamber and thrust manually in opposite directions into the channel where suitable surfaces of the fixture guide the loops into alignment so that the loops interlace when the wires are tensioned. The surfaces of the fixture between the interlaced loops and the bale are disposed on a member which pivots toward the bale in the bale chamber, thereby releasing the tie from the member with its ends tied, leaving the tie secured about the bale.

The surfaces for guiding the loops into alignment are within the channel and are thus concealed by the bale along with the loops as they are being aligned. It is, therefore, necessary to detect the proper alignment of the loops by "feel" of the portion of the wires extended outwardly from the fixture, so that improper alignment of the loops occurs even with experienced labor and is especially prevalent with inexperienced labor. As a result, it often happens that the loops are not interlaced or are improperly interlaced when compression of the bale is released by the platen. Recompression of the bale is then required when proper interlacing does not occur, resulting in substantial loss in time during the busy baling season.

It has long been recognized as highly advantageous to provide a wire tying fixture for use in interlacing the loops of wire ties for cotton bales which insures that the loops, although concealed within the fixture, are properly aligned for interlacing without relying on manipulations of portions of the wire remote from the loops.

PRIOR ART STATEMENT

In conformance with 37 C.F.R. §1.97 and §1.98, the applicant states that he is not aware of any prior art which is relevant to the patentability of the subject invention other than that described above.

SUMMARY OF THE INVENTION

It is an object of the present invention to provide an improved wire tying fixture.

Another object is to provide such a fixture which reliably aligns a pair of mating loops which connect wires of a bale tie in interlaced relation when the wires are tensioned.

Another object is to provide such a fixture where the proper alignment of the loops is achieved without assistance of the tactile sense although the loops are concealed or partially concealed during alignment.

Another object is to provide such a fixture having improved elements and arrangements thereof adapted for installation on existing wire tying fixtures.

A further object is to provide such a fixture wherein the improved elements are low in cost, simple to install, durable, and fully dependable in carrying out their intended purposes.

DESCRIPTION OF THE PREFERRED EMBODIMENT

Figure 1:
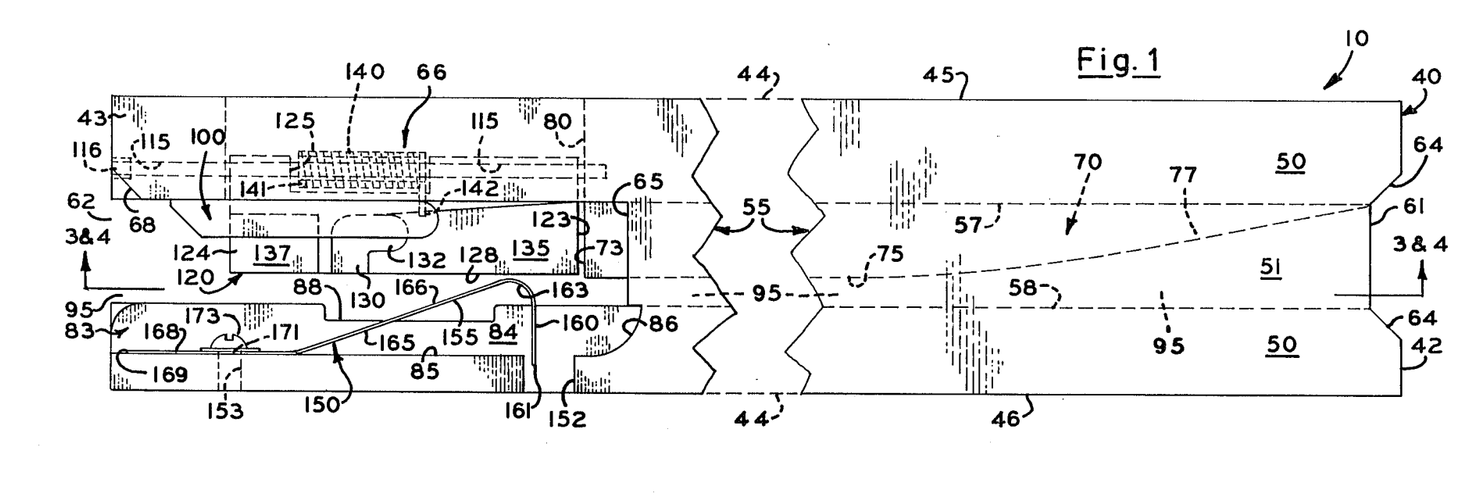
FIG. 1 is a top plan view of a wire tying fixture embodying the principles of the present invention with the central portion of the fixture omitted for illustrative convenience.
Figure 2:
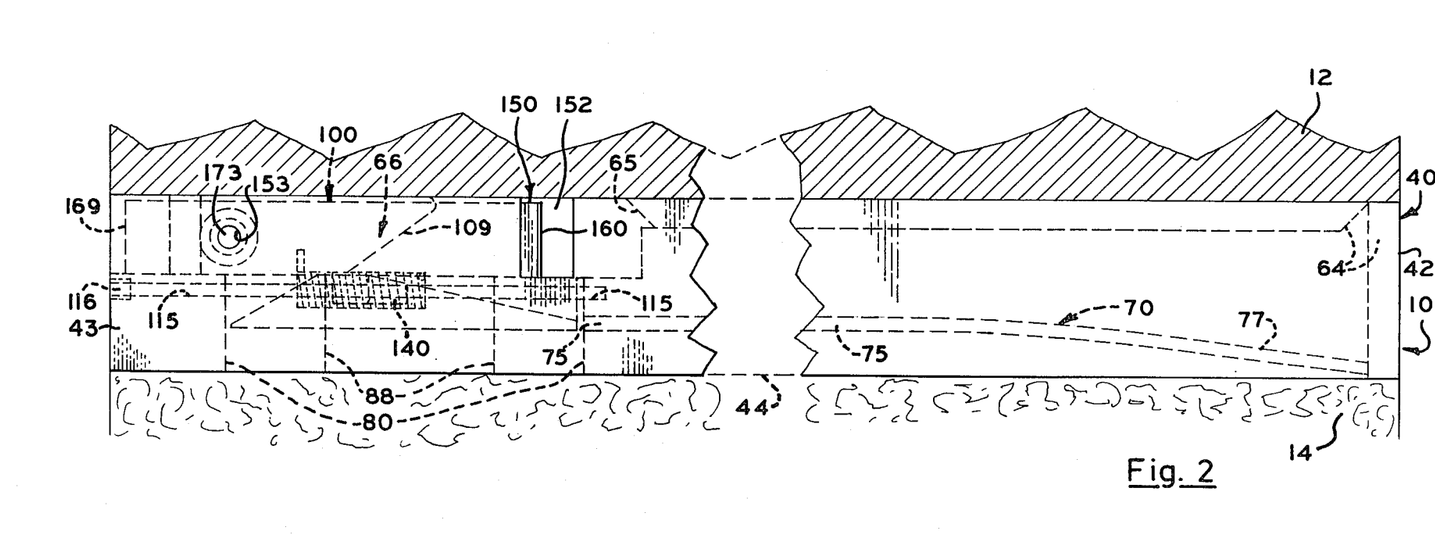
FIG. 2 is a side elevation of the fixture of FIG. 1 together with a fragmentarily represented platen and a fragmentarily represented bale compressed thereby.
Figure 6:
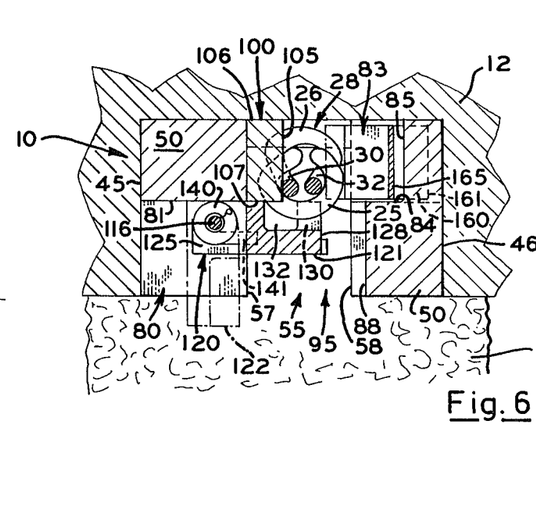
FIG. 6 is a vertical section of the fixture and tied loops, together with a platen and a bale which are fragmentarily represented, taken from the position of line 6—6 of FIG. 4 with an alternate position of the false floor shown in dash lines.

Referring with greater particularity to the drawings, a wire tying fixture 10 embodying the principles of the present invention is best shown in FIGS. 1, 2, and 6. The fixture is fixedly mounted on a platen 12 for compressing a bale 14 in a well-known manner.

Figure 4:
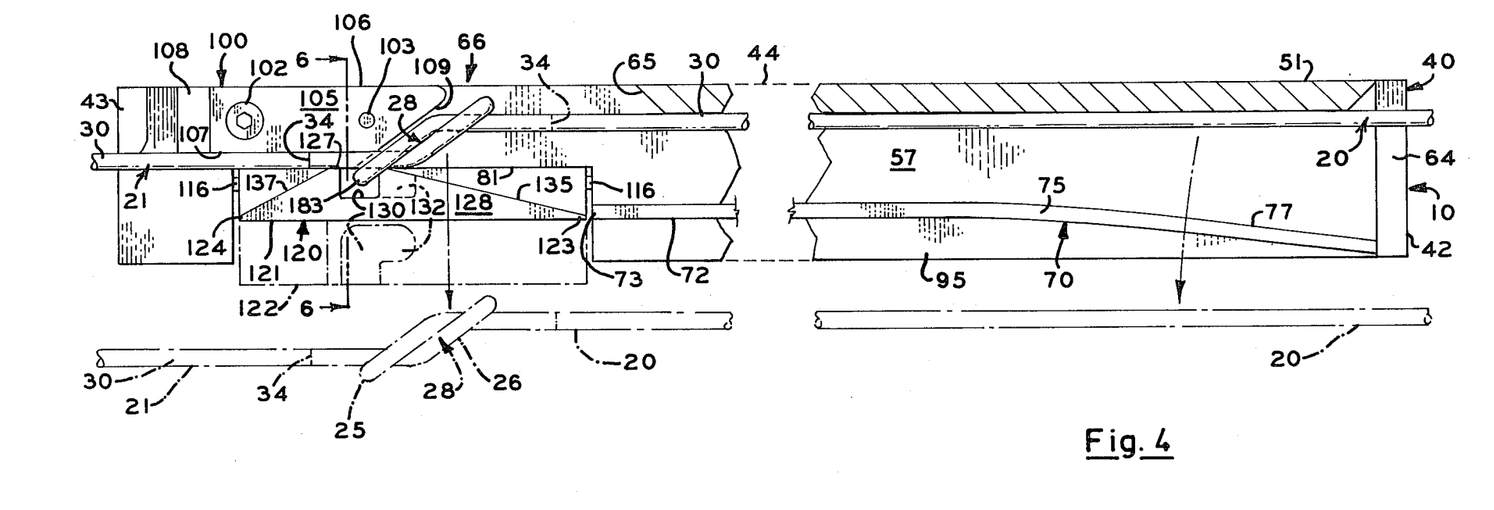
FIG. 4 is a vertical section taken from the same position as FIG. 3 showing the loops in a tied configuration with a subsequent position of the loops and of a false floor of the fixture depicted in dash lines.
Figure 5:
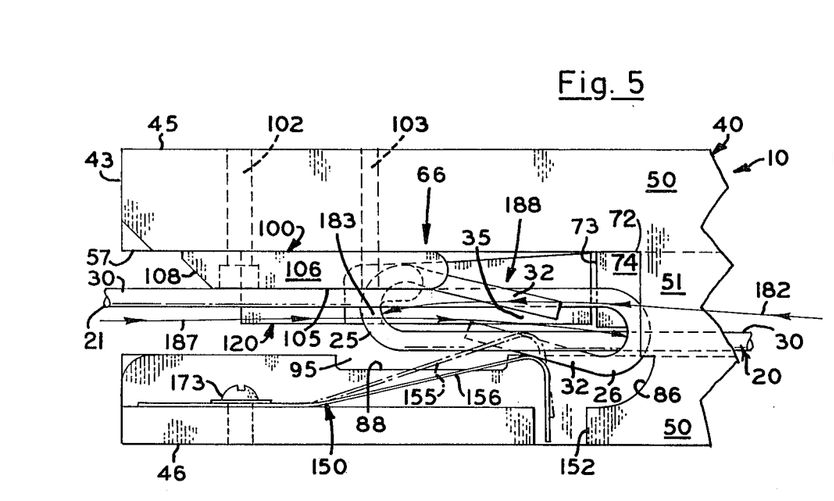
FIG. 5 is a fragmentary plan view of the fixture and the interlaced loops taken from the position of line 5—5 of FIG. 3.

The fixture 10 is for use with a first wire 20 and a second wire 21, best shown in FIGS. 4, 5, and 6, and terminating, respectively, in a first loop 25 and a second loop 26. The loops are pre-formed in their respective wires and are similarly dimensioned, but are mirror images of each other. The loops are shaped to tie in a square knot configuration 28, shown in FIGS. 4, 6, and 7, wherein the wires are interconnected in end-to-end relation.

Figure 3:
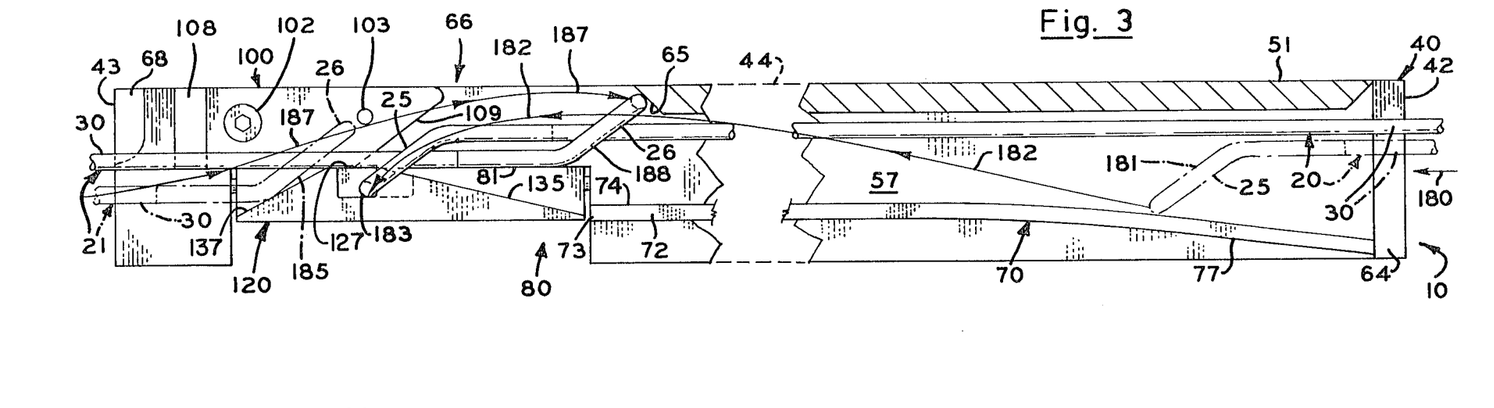
FIG. 3 is a vertical section of the fixture taken from the position of line 3—3 of FIG. 1 with a pair of wire loops in an interlaced configuration with a prior position of each loop depicted in dash lines.

The wires 20 and 21 are resiliently flexible and each has an elongated standing part 30, best shown in FIGS. 3, 4, and 5. In these figures, the standing part of the first wire is depicted as extending from the loops 25 and 26 toward the righthand side and the standing part of the second wire is depicted as extending toward the lefthand side. Typically, these parts are the opposite ends of a tie circumscribing the bale 14 and thus the wires 20 and 21 are opposite end portions of the same wire. The loops are open and are continuous with the corresponding standing part. Each wire has a running part 32 which is continuous with its respective loop and converges from the loop toward the standing part to an end 34 of the wire spaced therefrom and defining a gap 35 between the parts. The running part and the standing part of each wire lie substantially in a common plane from which the loop is angularly extended. When the wires are aligned for engagement in their tied configuration 28, the first loop 25 is extended downwardly from the corresponding common plane, and the second loop is extended upwardly from its corresponding common plane. When the wires are so aligned, the running part of the first wire is disposed in a direction toward one side of the loops when tied, this direction being toward the top of FIG. 5 and toward the left of FIG. 6. The running part of the second wire is disposed in the opposite direction so that the first wire is looped to one side while the second wire is looped to an opposite side.

The fixture 10 has an elongated guide 40, best shown in FIGS. 1 and 2, which externally is of rectangular, bar-like form and is elongated in a direction along the standing parts 30 so that the guide has a forward end 42 and an opposite, rearward end 43. These ends are spaced a distance substantially equal to the corresponding dimension of a bale 14, and the central portion of the guide is extended accordingly, as indicated by the dash lines 44. When the loops 25 and 26 are in the tied configuration 28, the standing part of the first wire 20 extends from the loops toward and outwardly of the forward end and the standing part of the second wire 21 is extended toward and outwardly of the rearward end. The guide has a first side 45 and a horizontally and transversely oppositely disposed second side 46. When the wires are in their tied configuration, the running part 32 of the first wire is disposed toward the first side and the running part of the second wire is disposed toward the second side.

The guide 40 is unitarily constructed and has a pair of transversely opposite side walls 50 connected at their upper sides by a horizontal plate 51. These walls and plate thus define an elongated channel 55 extended longitudinally entirely through the guide between its ends 42 and 43. The facing sides of these walls and plate are substantially planar and the channel thus has a planar first side 57 disposed toward the first side 45 of the guide and an opposite planar second side 58 disposed toward the second side 46 of the guide. The sides of the channel are spaced a distance somewhat greater than the transverse width of the loops 25 and 26. The channel has a forward open end 61 and a rearward open end 62 corresponding, respectively, to the ends 42 and 43 of the guide. At the forward end of the channel, the side walls and top plate terminate substantially at a common transverse plane and are beveled, as indicated by the numeral 64. The top plate terminates a substantial distance from the rearward end of the guide at an edge 65, defining a tying station 66 of the channel disposed between this edge and the rearward end of the guide. This edge is beveled downwardly in a direction from the second end toward the first end. The edges of the side walls adjacent to the tying station at the rearward end of the channel are beveled, as indicated by the numeral 68.

The guide 40 has a membrane 70 extending transversely from the first side 57 of the channel 55 toward its second side 58. Longitudinally of the guide, the membrane is approximately coextensive with the top plate 51. The membrane has a substantially planar and horizontal rearward portion 72 adjacent to the tying station. This portion terminates in juxtaposed relation to the tying station in a vertical planar end 73 which is normal to the first side of the channel and is spaced somewhat toward the rearward end 43 of the guide from the top plate. The rearward portion of the membrane has an upper surface 74 spaced downwardly from the top plate a distance somewhat greater than the vertical dimension of the loop 25. This portion provides a planar edge 75 parallel to the second side and spaced therefrom a distance substantially greater than the thickness of the standing part 30 of the wire 20. The membrane has a forward portion 77 opposite of its rearward portion from the tying station. The forward portion curves downwardly from the rearward portion to the lower edges of the side walls 50 and is tapered in convergent relation to the first side of the channel. The channel thus deepens and the slot widens in a direction toward the forward end 42 of the guide.

At the tying station 66, the guide 40 has a first cutaway 80 in the one of its side walls 50 corresponding to its first side 45. This cutaway is rectangular and extends longitudinally from the end 73 of the membrane 70 to a point spaced substantially from the rearward end 43. This cutaway extends transversely entirely through the side wall between the channel 55 and the first side. The cutaway extends vertically from the lower side of the wall to a horizontal planar surface 81 of the wall disposed somewhat above the surface 74 of the membrane. The guide 40 has a second cutaway 83 at the tying station 66 in the second side 58 of the channel 55. The second cutaway is of step-like configuration, having a planar lower surface 84 substantially coplanar with the surface 81 and a vertical surface 85 parallel to the second side 46 of the guide and disposed centrally between this side and the second side of the channel. The second cutaway extends longitudinally from the top plate 51 entirely to the rearward end 43 of the guide and thus widens the portion of the channel above the membrane at the tying station. The cutaway has a concave end 86 adjacent to the top plate and approximately conforming to the exterior of the loop 26. The guide 40 has a third cutaway 88 extending downwardly from the lower surface 84 of the second cutaway 83 to the bottom of the guide. Longitudinally of the guide, the third cutaway is approximately one-third the length of the second cutaway and is centrally disposed therein while being substantially centered in relation to the first cutaway 80. Transversely of the guide, the depth of the third cutaway is substantially less than the width of the surface 84 and the bottom of this cutaway is vertical and parallel to the surface 85.

The guide 40 has a downwardly open slot 95 which is longitudinally coextensive with the channel 55. At the tying station 66, the slot is defined between the side walls 50 while, between this station and the forward end 42 of the guide, the slot is defined between the edge 75 of the membrane 70 and the one of these walls corresponding to the second side 58 of the channel.

Figure 7:
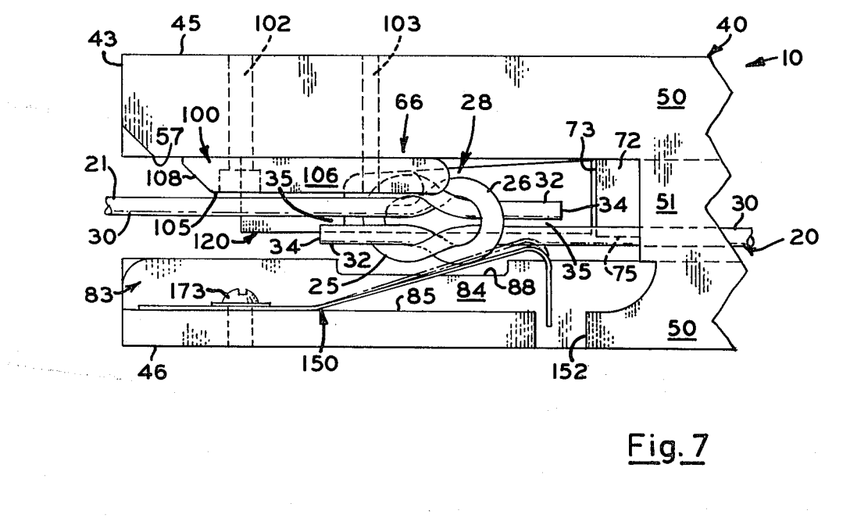
FIG. 7 is a plan view similar to FIG. 5 with the loops in the tied configuration.

The fixture 10 includes a cam 100, best shown in FIGS. 4, 5, and 7, rigidly mounted on the first side 57 of the channel 55 at the tying station 66. The cam is secured to the guide 40 in any suitable manner, as by a screw 102 and pin 103, shown only in these figures for clarity and extended through suitable bores in the cam and the corresponding one of the side walls 50. The cam is flatly engaged with the side wall and has a planar surface 105 opposite this wall and spaced from the vertical surface 85 a distance substantially greater than the transverse width of a loop 25 or 26. The cam has an upper surface 106 which is substantially coplanar with the upper surface of the plate 51, a lower surface 107 which is substantially coplanar with the surfaces 81 and 84, and a beveled end 108 which is disposed toward and spaced somewhat from the rearward end 43 of the guide 40. The end of the cam opposite the beveled end provides a planar camming surface 109 which is substantially normal to the first side of the channel and extends upwardly from the lower surface of the cam rearwardly toward its upper surface. The intersection of this surface and the camming surface is rounded and, longitudinally of the guide 40, is disposed substantially at the center of the first cutaway 80 and oppositely of the channel from the third cutaway 88.

The guide 40 is provided with a pair of axially aligned, horizontal bores 115, best shown in FIGS. 1 and 2, extending longitudinally through the one of the side walls 50 having the first cutaway 80. One of the bores extends from the rearward end 43 to the cutaway and the other extends from the cutaway into the one side wall toward the forward end 42 as best shown in FIG. 6, the bores are adjacent to the intersection of the first side 57 of the channel 55 and the surface 81 of the cutaway. A pivot pin 116, best shown in FIGS. 1, 4, and 6, is extended through these bores and, therefore, across the cutaway.

The fixture 10 has a false bottom 120, best shown in FIGS. 1, 4, and 6, pivotally mounted on the pin 116 and extended therefrom into the slot 95 at the tying station 66. The false bottom is thus mounted below the cam 100 adjacent to the rearward end 43 of the guide 40 for movement about an axis disposed longitudinally of the channel 55 at its first side 57. The false bottom is mounted for pivotal movement between a closed position 121 extended horizontally across the channel 55 and a retracted position 122, depicted in long and short dash lines in FIGS. 4 and 6, in which the false bottom is pivoted downwardly out of the channel. Longitudinally of the guide, the false bottom is substantially coextensive with the first cutaway 80, having a forward end 123 and a rearward end 124 which are closely adjacent to the corresponding ends of the cutaway. The portion of the false bottom disposed in the cutaway is provided with a central notch 125 through which the pin 116 extends. The false bottom has a planar lower surface and a parallel, planar upper surface 127 spaced from the lower surface approximately one-half of the vertical dimension of the cutaway. In the closed position, this upper surface is flatly engaged with the surface 81 of the cutaway and is, therefore, substantially coplanar with the lower surface 84 of the second cutaway 83. In the closed position, the upper surface 127 is also substantially coplanar with the lower surface 107 of the cam 100 and is spaced from the camming surface 119 a distance less than the thickness of a wire 20 or 21. The false bottom extends transversely from the first side 57 of the channel 55 toward its second side 58, terminating in a vertical planar surface 128 which is substantially coplanar with the edge 75 of the membrane 70. In its closed position, the false bottom thus provides a floor in the slot 95 of the tying station 66.

The portion of the upper surface 127 extended into the slot 95 from the first side 57 of the channel 55 is provided with a transverse notch 130 aligned transversely of the guide 40 with the intersection of the lower surface 107 and the camming surface 109 of the cam 100. This notch opens through the surface 128 and, in the closed position 121, extends transversely therefrom to the first side 57 of the channel. The depth of the notch is somewhat greater than the thickness of a wire 20 or 21, and the width of the notch longitudinally of the guide is approximately twice its depth. The upper surface is provided with a longitudinal notch 132 extended from the transverse notch beneath the surface 107 of the cam in a direction toward the forward end 42 in parallel adjacent relation to the first side of the channel. The width and depth of these notches are substantially equal and the length of the longitudinal notch is approximately equal to its width.

The upper surface 127 of the false bottom 120 has an inclined plane 135 extending toward the forward end 123 from the transverse notch 130 and has an inclined plane 137 extending toward the rearward end 124. These plates are substantially normal to the first side 57 of the channel 55 when the bottom is in its closed position 121. Each plane is inclined downwardly from the notch toward the corresponding end of the false bottom to substantially the elevation of the upper surface 74 of the membrane 70. Transversely of the guide, the planes are substantially as wide as the end 73 of the membrane. The forwardly extended plane is juxtaposed at the forward end of the false bottom to this end.

The fixture 10 has a helical spring 140 disposed in the notch 125 of the false bottom 120 in coaxial relation to the pin 116. One end 141 of the spring is engaged with the false bottom and the other end 142 of the spring extends in a direction toward the surface 81 into engagement with the guide 40. The spring is wound so that it resiliently urges the false bottom to pivot in a direction toward its closed position 121 from its retracted position 122.

The structure of the fixture 10 described heretofore is well known, as are the wires 20 and 21 and their interlacing and intertying loops 25 and 26. The present invention includes the provision of a leaf spring 150 for the fixture achieving vastly improved wire tying dependability. This spring is depicted in an undeflected configuration 155, best shown in FIG. 1, and in alternate long and short dash lines in FIG. 5. The leaf spring has a deflected configuration 156 depicted in FIG. 5. The spring is mounted on the guide 40 at the tying station 66 on the second side 58 of the channel 55; that is, on the side of the channel opposite from the pin 116 about which the false bottom 120 pivots. To accommodate the leaf spring, a guide 40 having the prior art structure is provided with an upwardly open notch 152 and a screw-threaded bore 153 disposed in the one of its side walls 50 corresponding to the second side of the channel. The forward edge of the notch is aligned longitudinally of the guide with the forward end 123 of the false bottom 120. The notch extends entirely through the corresponding side wall from the vertical surface 85 of the second cutaway 83 to the second side 46 of the guide. The notch is rectangular as viewed transversely of the guide and extends upwardly from the vertical lower surface 84 of this cutaway. The screw-threaded bore extends horizontally through the side wall from the vertical surface of the cutaway to the second side of the guide. Vertically, this bore is disposed centrally of the vertical surface and is aligned longitudinally of the guide with the rearward end 124 of the false bottom.

The leaf spring 150 is constructed from an elongated, vertically transverse, continuous strip of resilient sheet material and is described in its undeflected configuration 155. The spring has a planar forward portion 160 which extends transversely of the guide 40 into the notch 152 terminating in an end 161 within the notch. The spring extends from this end to a bend 163 which is centrally disposed in the channel 55 and connects the forward portion to a planar central portion 165. The central portion extends angularly across the channel from the bend to the second side 58 at a point thereon disposed somewhat rearwardly of the guide from the transverse notch 130. The central portion provides a camming surface 166 facing the first side 57 of the channel. This camming surface is thus resilient and is convergent to this first side in a direction forwardly of the guide 40. The spring has a planar rearward portion 168 which is flatly engaged with the second side of the channel and extends from the central portion to an end 169 disposed adjacent to the rearward end 43 of the guide. The rearward portion is provided with a bore 171 aligned with the screw-threaded bore 153, and the spring is secured to the guide by a screw-and-washer assembly extended through the bore on the spring and screw-threadably engaged with the bore in the guide. The leaf spring is thereby fastened to the guide in upwardly adjacent relation to the false bottom 120.

OPERATION

The operation of the described embodiment of the present invention is believed to be clearly apparent and is briefly summarized at this point. With the fixture 10 disposed, as best shown in FIGS. 3 and 5, with the false bottom 120 in its closed position 121 and with the guide 40 engaged with a bale 14, the first wire 20 is manually thrust into the channel 55 through the forward end 42 of the guide in a direction toward its rearward end 43 as indicated by the arrow 180. The wire is inserted in a disposition 181, depicted in alternate long and short dash lines in FIG. 3, in which the loops 25 is leading and is downwardly angularly extended. Entrance of the loop into the channel is facilitated by the beveled portions 64 and the downwardly curved shape of the forward portion 77 of the membrane 70. Continued movement of the wire toward the rearward end is guided by the channel 55 until the loop reaches the tying station 66.

At the tying station 66, the first wire 20 moves in a path, shown in FIGS. 3 and 5 and indicated by the numeral 182, in which the first loop 25 enters the notch 130 which is disposed transversely of the path. Transversely of the guide, as best shown in FIG. 5, this path is predetermined on one side by the first side 57 of the channel 55 and on the other side by the bend 163 and the camming surface 166 of the leaf spring 150. These elements of the spring resiliently urge the wire toward the first side of the channel, the side mounting the false bottom 120, and ensures that the loop is aligned with the notch. The leaf spring deflects transversely sufficiently to allow the passage of the loop past the bend, the spring thereafter engaging the standing part 130 of the first wire. Vertically, this path is predetermined, as best shown in FIG. 3, by the inclined plane 135 of the false bottom 120 and the camming surface 109 of the cam 100. This plane and surface guide the loop to the elevation at which the cam engages the upper surface 127 of the false bottom when the latter is in its closed position 121. When the loop is adjacent to the notch, continued thrusting of the wire along the path causes the loop to be cammed downwardly by the cam into the notch, pivoting the false bottom sufficiently from its closed position against the urging of the helical spring 140 to accommodate the wire below the cam until the wire reaches the notch. The spring then returns the false bottom to its closed position. The wire is thus captured in the notch, as indicated by the numeral 183 in FIGS. 3, 4, and 5, with the cam overlapping the loop. When captured, the loop rests within the notch on the false bottom and is thereby supported in the channel 55 with the wire in a predetermined fixed position longitudinally of the guide.

The second wire 21 is then disposed with its loop 26 leading and upwardly angularly extended and with the running part 32 disposed toward the camming surface 166 of the leaf spring 150. The wire is next thrust into the channel 55, as depicted in FIG. 3 in alternate long and short dash lines and indicated by the numeral 185, in a direction from the rearward end 43 of the guide 40 toward its forward end 142. As a result, the second wire is thrust toward the tying station 66 in a direction opposite to the direction from which the first wire 20 is thrust therein. Entrance of the loop into the channel is facilitated by the beveled portions 68 of the walls 50 and the plate 51 and by the beveled end 107 of the cam 100. As the wire is thrust into the channel, its loop moves in a path 187, shown in FIGS. 3 and 5, which is disposed upwardly in the channel toward the first side 46 of the guide 40, the side on which the false bottom 120 is pivotally mounted by the pin 116. This path is upwardly of the channel since the side of the loop toward its running part can only be received within the second cutaway 83, as shown in FIG. 6, and its standing part 30 is urged upwardly by the inclined plane 137 of the false bottom as shown in FIG. 3. The path is toward the first side since the camming surface 166, which is convergent to the first side in the direction the second wire is thrust into the guide, engages the loop and resiliently urges it toward the cam.

As the second wire 20 is thrust along the path 187 into the tying station 66, the loop 26 overlaps the loop 25 of the first wire 20 with the leaf spring 150 being deflected somewhat beyond its position 156 to permit passage of the loop by the bend 163. Movement of the second wire in this overlapping relation continues to a predetermined extent at which the second loop engages the beveled edge 65 of the top plate 51, substantially as depicted in FIG. 5. At this point, the second loop has passed the bend so that the spring has returned toward its undeflected position 155, and the bend resiliently engages the running part 32 of the second wire oppositely of its standing part 30. The spring thus urges the second wire transversely of the guide into a position in which these parts of the second wire are centrally aligned in the first loop 25 which is captured in the notch 130 of the false bottom 120. The first loop is thus held by this notch to facilitate thrusting of the second wire into overlapping relation with the first wire. Engagement of the second wire with the beveled edge of the top plate urges the second loop downwardly so that these parts are centrally aligned vertically with the first loop, as shown in FIGS. 3 through 6. Since the loops are similarly dimensioned, when the second loop is so aligned, the corresponding parts of the first wire 20 are similarly centrally aligned vertically and transversely with the second loop. As the wires move in their overlapped disposition, the standing part of each wire passes between the standing part and the running part of the other wire until the end 34 of each wire passes the loop of the other wire, whereupon the leaf spring resiliently urges the wires into a position with the wires engaged in an interlaced disposition, indicated by the numeral 188, over the false bottom 120 and supported thereby in the channel 55. In this disposition, the wires interlace with the standing part 30 and the running part 32 of each wire extended through the loop of the other wire so that tensioning the wires ties them in the square knot configuration 28.

When the wires 20 and 21 are disposed in their interlaced aligned position 188, the platen 12 is raised, allowing the bale 14 to expand and tension the wires, drawing them into the square knot configuration 28 and connecting the wires in end-to-end relation. As the platen continues to rise, the wires are retained by the bale so that the wires pivot the false bottom 120 toward its retracted position 122 by overcoming the resilient urging of the helical spring 140. As the false bottom pivots downwardly, the third cutaway provides clearance for the tied loops to pass downwardly from the tying station 66. When the false bottom attains the retracted position, the wires are released from the tying station and the standing part 30 of the first wire passes downwardly through the slot 40, leaving the wires tied in a square knot and secured about the bale.

Since the loops 25 and 26 are resiliently urged by the leaf spring 150 into interlaced engagement in the disposition 188 in which they are aligned for tying in the square knot configuration 28, the fixture reliably and automatically aligns the loops for such tying without assistance from the tactile sense of persons thrusting the wires 20 and 21 into the fixture 10. Since the guide 40 differs from the guide of prior art fixtures principally in the provision of the notch 152 and bore 153 and by the addition of the leaf spring, the spring is easily installed in an existing fixture.

Although the invention has been herein shown and described in what is conceived to be the most practical and preferred embodiment, it is understood that departures may be made therefrom within the scope of the invention, which is not to be limited to the illustrative details disclosed.

Having described my invention, what I claim as new and desire to secure by Letters Patent is:

1. A wire tying fixture comprising:
   A. an elongated guide having a longitudinal channel providing open opposite ends and a slot coextensive with the channel, said channel having a tying station therein and being adapted to receive wires thrust from the opposite ends into overlapping relation at the tying station, said wires being preformed to interlace when engaged and overlapped to a predetermined extent and to tie when subsequently tensioned;
   B. a false bottom pivotally mounted in the slot at the tying station for movement about an axis disposed longitudinally of the channel at one side thereof for movement between a closed position extended across the channel to support the wires in the channel and a retracted position pivoted out of the channel to release the wires after they are tied, the false bottom having a notch adapted to receive and to hold one of the wires to facilitate thrusting of the other wire into overlapping relation therewith;
   C. resilient means urging the false bottom into a closed position; and
   D. a leaf spring mounted at the tying station at the side of the channel opposite to said one side presenting a resilient camming surface convergent with said one side in the direction said other wire is thrust into the channel to urge said wires towards said one side into interlacing engagement over the false bottom.

2. The fixture of claim 1 in which said one wire has a path to the notch predetermined by the leaf spring and said one side of the channel and in which the notch is elongated transversely of said path.

3. The fixture of claim 2 including a cam rigidly mounted on the side of the channel having a surface in facing juxtaposition to the notch in the false bottom, the cam having a camming surface extended along said path to a portion of the camming surface spaced from the false bottom a distance less than the thickness of the wire whereby thrusting said one wire along said path pivots the false bottom from the closed position sufficiently to accommodate the wire until its reaches the notch whereupon the false bottom returns to the closed position, capturing said one wire in the notch.

4. The fixture of claim 1 in which the leaf spring includes a bend disposed to engage said one wire as it is thrust into the tying station and said opposite wire as it is thrust into the tying station from the opposite direction resiliently urging each to the side of the channel mounting the false bottom.

5. A fixture for tying a square knot interconnecting in end-to-end relation a pair of pre-formed, resiliently flexible wires each having an elongated standing part, and open loop continuous with the standing part, and a running part continuous with the loop which converges toward its standing part and ends in spaced relation to the standing part to define a gap therebetween, one of the wires being looped to one side, having its standing part and running part disposed in a common plane and its loop angularly extended downwardly from such plane, the other of said wires being looped to the opposite side having its standing part and running part disposed in a common plane and its loop angularly extended upwardly from such plane, comprising:
   A. a guide having forward and rearward ends and first and second sides providing an elongated longitudinal channel defined by opposite side walls spaced to receive the loops transversely therebetween adapted to receive said one wire loop-first in the forward end of the guide with its loop downwardly angularly displaced and the rearward end being adapted to receive said other wire loop-first in the rearward end of the guide with its loop upwardly angularly extended and said guide having a downwardly open slot coextensive with the channel;
   B. a false bottom mounted in the adjacent to the rearward end of the guide for pivotal movement about an axis longitudinally of the channel disposed along the first side of the channel between a closed position providing a floor in the slot and a downwardly pivoted retracted position; said bottom when in the closed position being adapted to receive the loop of said one wire releasably to hold the one wire in predetermined position to receive the loop of said other wire when thrust into the opposite end of the guide;
   C. resilient means urging the bottom into the closed position; and
   D. a leaf spring having an end fastened to the guide at the second side of the channel adjacent to the false bottom and extended forwardly in convergent relation to said one side of the channel having a surface disposed resiliently to engage the standing part of said one wire to urge its loop toward said one side of the guide when the one wire is thrust loop-first into the forward end of the guide, and to engage the side of the loop of said other wire so that as the other wire is thrust loop-first into the rearward end of the guide, the spring urges the loop of said other wire toward the cam so that the standing part of each wire passes between the standing part and the running part of the opposite wire until the ends of the wires pass the loops of the opposite wires whereupon the spring resiliently urges the standing part and the running part of each wire to align with the loop of the opposite wire so that by tensioning the wires, a square knot is formed interconnecting the wires in end-to-end relation, said bottom being pivotal to retracted positions to release the wires by overcoming resilient means.

6. A fixture for tying a square knot interconnecting in end-to-end relation a pair of pre-formed, resiliently flexible wires each having an elongated standing part, an open loop continuous with the standing part, and a running part continuous with the loop which converges toward its standing part and ends in spaced relation to the standing part to define a gap therebetween, one of the wires being looped to one side, having its standing part and running part disposed in a common plane and its loop angularly extended downwardly from such plane, the other of said wires being looped to the opposite side having its standing part and running part disposed in a common plane and its loop angularly extended upwardly from such plane, comprising:

A. a guide having forward and rearward ends and first and second sides providing an elongated longitudinal channel defined by opposite side walls spaced to receive the loops transversely therebetween adapted to receive said one wire loop-first in the forward end of the guide with its loop downwardly angularly displaced and the rearward end being adapted to receive said other wire loop-first in the rearward end of the guide with its loop upwardly angularly extended and said guide having a downwardly open slot coextensive with the channel;

B. a false bottom mounted in the slot adjacent to the rearward end of the guide for pivotal movement about an axis longitudinally of the channel disposed along the first side of the channel between a closed position providing a floor in the slot and a downwardly pivoted retracted position; said bottom having a transverse notch disposed to receive the loop of said one wire releasably to hold the one wire in fixed longitudinal position in the guide when thrust into the forward end of the guide;

C. resilient means urging the bottom into the closed position;

D. a cam mounted on said one side of the channel of the guide above the false bottom disposed when the false bottom is in the closed position to cam the loop of said one wire downwardly into the notch when the one wire is thrust loop-first into the forward end of the channel and to overlie the notch to capture the loop therein; and E. a leaf spring having an end fastened to the guide at the second side of the channel adjacent to the cam and extended forwardly in convergent relation to said one side of the channel having a surface disposed resiliently to engage the standing part of said one wire to urge its loop toward said one side of the guide when the one wire is thrust loop-first into the forward end of the guide, and to engage the side of the loop of said other wire so that as the other wire is thrust loop-first into the rearward end of the guide, the spring urges the loop of said other wire toward the cam so that the standing part of each wire passes between the standing part and the running part of the opposite wire until the ends of the wires pass the loops of the opposite wires whereupon the spring resiliently urges the standing part and the running part of each wire to align with the loop of the opposite wire so that by tensioning the wires, a square knot is formed interconnecting the wires in end-to-end relation, said bottom being pivotal to retracted positions to release the wires by overcoming said resilient means.

* * * * *

UNITED STATES PATENT AND TRADEMARK OFFICE
CERTIFICATE OF CORRECTION

PATENT NO. : 4,353,295
DATED : October 12, 1982
INVENTOR(S) : Ernest Kandarian

It is certified that error appears in the above-identified patent and that said Letters Patent are hereby corrected as shown below:

Column 11, line 12, between "overcoming" and "resil-"

insert ---said---.

Signed and Sealed this

Seventh Day of December 1982

[SEAL]

Attest:

GERALD J. MOSSINGHOFF

Attesting Officer     Commissioner of Patents and Trademarks